(12) United States Patent
Whillock et al.

(10) Patent No.: US 8,009,844 B2
(45) Date of Patent: Aug. 30, 2011

(54) TWO WAY DEVICE FREE COMMUNICATIONS SYSTEM

(75) Inventors: Rand P. Whillock, North Oaks, MN (US); Edward L. Cochran, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1306 days.

(21) Appl. No.: 11/607,580

(22) Filed: Dec. 1, 2006

(65) Prior Publication Data

US 2008/0130919 A1    Jun. 5, 2008

(51) Int. Cl.
*G09F 27/00* (2006.01)
*H04B 3/00* (2006.01)
*H04B 5/00* (2006.01)
*G06F 3/033* (2006.01)
*G09G 5/08* (2006.01)

(52) U.S. Cl. ............. 381/124; 381/77; 381/79; 345/158

(58) Field of Classification Search ............ 381/77, 381/79, 124; 345/158; 359/204.2, 217.2, 359/224.2
See application file for complete search history.

(56) References Cited

U.S. PATENT DOCUMENTS

| 5,859,915 | A  | * | 1/1999  | Norris .......................... 381/75 |
| 5,885,129 | A  |   | 3/1999  | Norris .......................... 446/405 |
| 6,317,237 | B1 | * | 11/2001 | Nakao et al. ................... 398/130 |
| 6,590,661 | B1 |   | 7/2003  | Shnier .......................... 356/432 |
| 2006/0109989 | A1 |   | 5/2006  | Linhard ....................... 381/160 |
| 2006/0139653 | A1 |   | 6/2006  | Chovan et al. ............... 356/484 |

FOREIGN PATENT DOCUMENTS

WO    WO 98/49868    11/1998

* cited by examiner

*Primary Examiner* — Devona E Faulk
*Assistant Examiner* — Douglas J Suthers
(74) *Attorney, Agent, or Firm* — Kermit D. Lopez; Luis M. Ortiz; Ortiz & Lopez, PLLC

(57) ABSTRACT

A two way communication system that does not require the use of a device by one of the communicators. The system employs an audio spotlight to project a signal to a specific location, where one person is, and a laser audio receiver to receive the response. Both the audio spotlight and the laser audio receiver are directed by a user seeking to communicate with the person at long range.

15 Claims, 2 Drawing Sheets

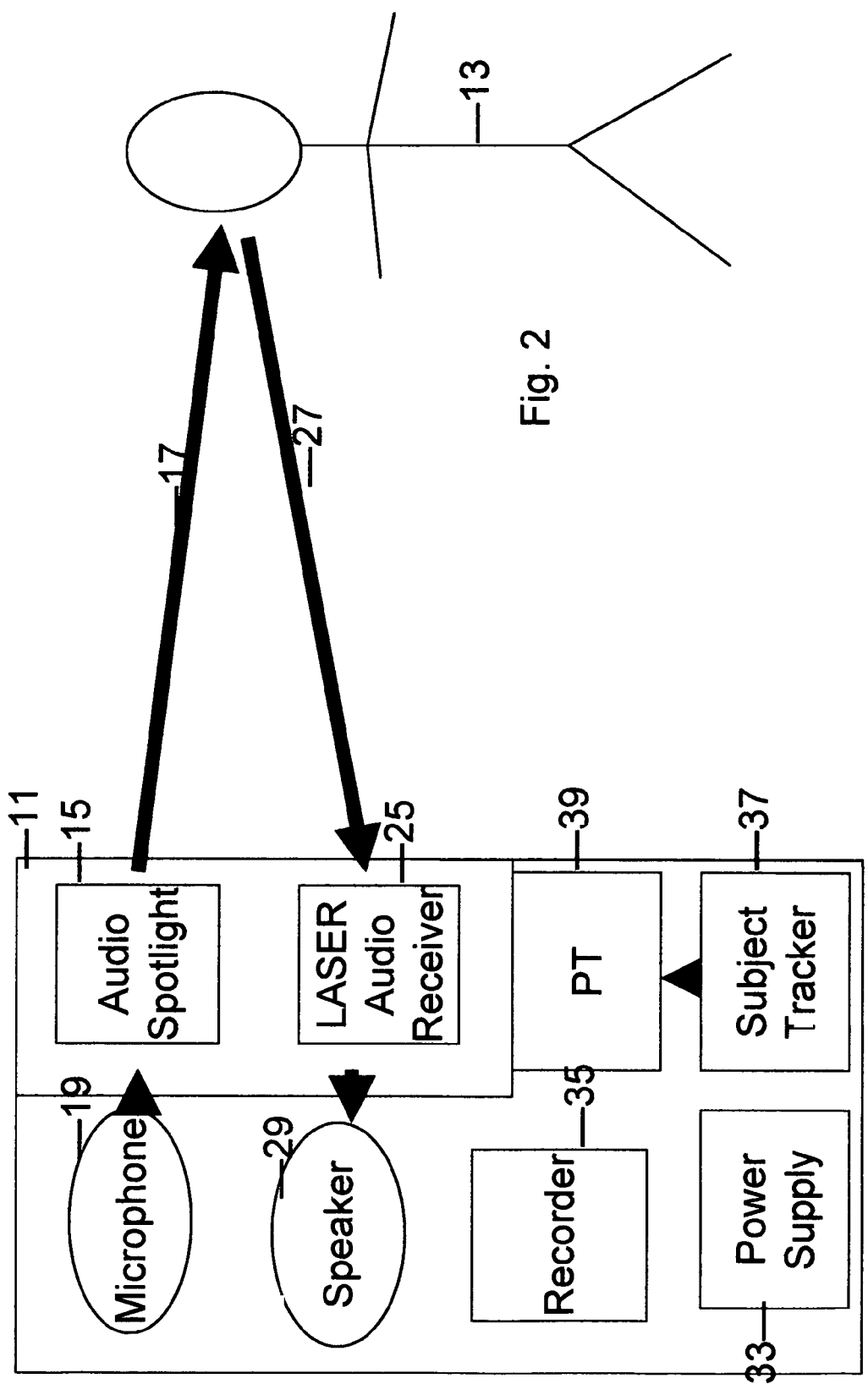

TWO WAY DEVICE FREE COMMUNICATIONS SYSTEM

FIELD OF THE INVENTION

The present invention relates in general to two way communications systems and, more particularly, to a device free communications system that permits two way communication over a long range.

BACKGROUND OF THE INVENTION

In some instances, persons working or otherwise located at a remote location have a need to communicate to another, such as a command center or other fixed location. When the person moves from one place to another, potentially doing something that involves both hands, it is awkward to communicate with a device that needs to be manually turned on and or operated for such communication.

In the past, two way radios have allowed such communication, as do cell phones. Some of these devices even include microphones that can be worn on the person to allow his or her hands to be free. However, this usage requires that the device be on, and there are times when one does not want communication constantly. It is also inconvenient to have to answer a ringing phone at the time when both hands need to be free.

In other instances, the person toward whom the communication is to be directed may not have a cell phone or radio with him or her.

Still others may have a cell phone or radio but the phone number or radio frequency may not be known to the communicator, such as when someone enters an area under control of some other person or organization.

It would be of great advantage if a communication system could be developed that would utilize other means to carry conversation and other date to and from an individual at a remote location.

Another advantage would be if a communication system could be provided that could transmit talk or other information over significant distances where simple voice communication, even by shouting, is not possible due to the distance.

Yet another advantage would be if a communication system could be provided that allows a communicator to speak with persons who enter an area under supervision or control.

Other advantages and features will appear hereinafter.

SUMMARY OF THE INVENTION

The present invention provides an effective communication system that is capable allows one party to the communication to be device free while the other party or parties operate the system.

In its simplest form the invention comprises an audio spotlight to project a narrow audio signal to a single person so that the system operator can talk to the person. It also uses a laser audio receiver to listen to audio responses from that person. The system can be manually aimed by a user or it may automatically be pointed and controlled by a tracking system.

The first component, the audio spotlight, includes a microphone into which the user speaks and this is transmitted to the person of interest. The second component, the laser audio receiver, receives the reply from the person of interest and broadcasts the response through a speaker. The two way communication can also be recorded by the system when a recorder is included. The system can be portable and battery powered or stationary with ground power. Since the two send and receive channels are totally independent from each other, simultaneous two-way communication is possible.

BRIEF DESCRIPTION OF THE DRAWINGS

For a more complete understanding of the invention, reference is hereby made to the drawings, in which:

FIG. 2 is is a schematic view of another embodiment of the present invention in which the system is automatically aimed.

In the figures, like reference characters designate identical or corresponding components and units throughout the several views.

DETAILED DESCRIPTION OF THE PREFERRED EMBODIMENT

Figure 1:
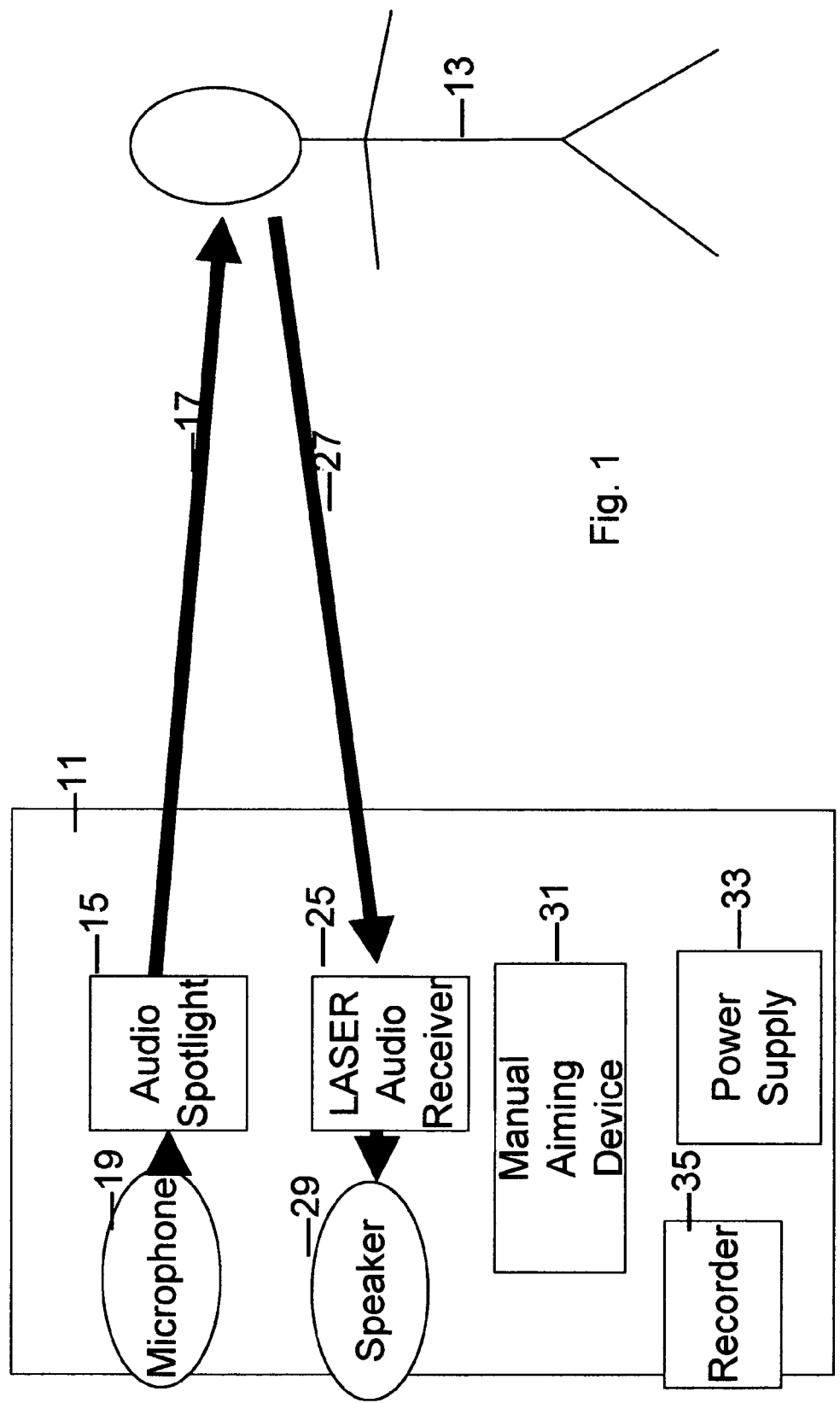
FIG. 1 is a schematic view of one embodiment of the present invention in which the system is manually aimed.

Referring to the figures, have been illustrated and described, they are merely exemplary and a person skilled in the art may make variations and modifications to the embodiments described herein without departing from the spirit and scope of the present invention.

As noted above, the system and method of this invention 11 in FIGS. 1 and 2 communicates with a person 13 at some distance beyond which the voice can carry. System 11 can be portable so that it is carried by hand, or in a helicopter or other vehicle. It may also be mounted at a fixed location. System 11 includes an audio spotlight 15, or other device for projecting a narrow audio signal, along arrow 17 as will be described below. This allows person 13 to hear what is spoken into microphone 19. The person 13 then speaks in the general direction of the system 11 and the laser audio receiver 25, or other device for focused listening over a distance receives the spoken words on arrow 27, which is then broadcast by speaker 29.

Microphone 19 may be a standard microphone mounted on the device or one of the many portable microphones including those worn by law enforcement officers and the like on their collar or other part of their uniform or clothing. Speaker 29 may be a standard speaker mounted on the device or one of the other forms of speakers, such as ear phones that permit only the user to hear the received sound. Speaker 29 may also include an alarm component that notifies the user of the device when someone is attempting to communicate with the user, such as, for example, when the device is aimed at a specific location or person who may be occupied with other tasks at the time of aiming. The send and receive channels are independently operated so that simultaneous two-way communication is possible.

FIG. 1 illustrates the use of a manual aiming device 31, which may be as simple as a control stick. Optionally the aiming device 31 may include a spot laser for locating the person more accurately. The system 11 is driven by a power supply 33 which may be from a power source or from a battery power. Optionally, a recorder 35 can be provided if desired. Recorder 35 can be manually actuated, automatically actuated or voice or sound actuated.

FIG. 2 is a modified system like FIG. 1 with the substitution of a subject tracker 37 which automatically locates and tracks a person 13 and passes information to a pan tilt unit 39 that aims both the audio spotlight 15 and laser 25. The system of FIG. 2 could be build with both the audio spotlight 15 and the laser 25 on a single pan tilt unit or on two separate pan tilt units. Again, the power supply 33 and optional recorder 35 are also shown in FIG. 2.

The preferred audio spotlight is a product manufactured by Holosonic Research Labs, and is describe in one or more of the following U.S. Pat. No. 6,914,991, No. 6,661,285, No. 6,771,785, and No. 6,775,388, the disclosure of each is incorporated by reference herein. The device functions by adding an audio signal such as speech from a microphone on to an ultrasonic carrier signal by modulating the sent audio signal and focusing the ultrasonic carrier signal at a desired location, whereby the sent audio signal is regenerated at the location. Between the transmitter and the location, the sent audio signal is substantially not audible. This feature allows the device to transmit to one location without the sound being heard at another location. Examples of where this is valuable are law enforcement work, military operations, security and other surveillances and the like.

The preferred laser audio receiver is a product manufactured by Digital Signal Corporation and is described in United States Patent Application 2006/0203224, published Sep. 14, 2006, the disclosure of which is incorporated by reference herein. The device functions by bounding a modulated carrier laser beam off a subject's skin in the head or neck region, which is then reflected back to the receiver. The receiver separates the audio from the returned signal and processes it as described.

All such equivalent variations and modifications are intended to be included within the scope of this invention, and it is not intended to limit the invention, except as defined by the following claims.

The invention claimed is:

1. A device for communicating to and from a remote location comprising:
   a laser pointer of visible frequency to assist in aiming a a beam transducer that transmits an ultrasonic parametric array of pressure waves to said remote location, in response to sonic pressure waves made by a user of the device, including a microphone to assist in creating said ultrasonic pressure waves from said user made pressure waves,
   a laser receiver to receive a modulated laser signal from said remote location including a transducer to make said received modulated laser signal audible;
   an aiming module to direct the laser receiver to said remote location, said aiming module including a subject tracker module to track a person at the remote location and a pan tilt module to aim the laser pointer at the person in response to an output of said subject tracker; and
   a power source to provide power to said device.

2. The device of claim 1, wherein said aiming module is a laser.

3. The device of claim 1, wherein said power source is selectable from battery power and a wired power source.

4. The device of claim 1, further comprising a recorder to record communication sent and/or received by said device.

5. The device of claim 1, wherein at least one of the said ultrasonic pressure waves and laser signals are not audible between the device and the remote location.

6. A device for communicating to a person at a remote location, comprising:
   parametric array generator means for transmitting a first signal to said remote location, including microphone means to create said signal from user input;
   laser audio receiver means for receiving a second signal from said remote location, including speaker means for transducing said second signal; a visible light aiming— means for directing the laser audio receiver to a surface providing a reflection at said remote location wherein said aiming means includes a tracker means for tracking a person and a pan tilt means for aiming said laser receiver in response to an output of said subject tracker means; and
   power means for providing power to said device.

7. The device of claim 6, wherein said aiming means is a visible laser beam.

8. The device of claim 6, wherein said power source means is selectable from battery power and a wired power source.

9. The device of claim 6, further comprising a recorder means for recording communication sent and/or received by said device.

10. The device of claim 6, wherein at least one of said first and second signals are not audible between the device and the remote location.

11. A method for communicating to and from a remote location, comprising:
   transmitting an ultrasonic beam containing audio to said remote location with a parametric array generator device including a microphone to create said ultrasonic beam:
   receiving sound from said remote location with a laser audio receiver including a speaker to transduce a laser signal to a sound:
   aiming said laser audio receiver at said remote location, said aiming using a subject tracker to track a person; and
   a pan tilt unit to aim the ultrasonic beam in response to an output of said subject tracker.

12. The method of claim 11, wherein said aiming of said laser audio receiver is assisted by a mechanical controller.

13. The method of claim 11, wherein said power supply is selectable from battery power and a wired power source.

14. The method of claim 11, further comprising recording communication sent and/or received by said device.

15. The method of claim 11, wherein at least one of said ultrasonic signal and laser signals are not audible between the device and the remote location.

* * * * *